United States Patent [19]
Weimer et al.

[11] Patent Number: 6,056,236
[45] Date of Patent: May 2, 2000

[54] STARTING DEVICE FOR A TOWED FLYING BODY

[75] Inventors: Peter Weimer, Markdorf; Rudolf Sock, Salem/Beuren, both of Germany

[73] Assignee: Dornier GmbH, Germany

[21] Appl. No.: 09/273,721

[22] Filed: Mar. 22, 1999

[30] Foreign Application Priority Data

Mar. 20, 1998 [DE] Germany ............... 197 12 330

[51] Int. Cl.⁷ ....................................... B64D 3/00
[52] U.S. Cl. ............................. 244/1 TD; 244/137.4
[58] Field of Search ............... 244/1 TD, 118.1, 244/137.4

[56] References Cited

U.S. PATENT DOCUMENTS

| | | | |
|---|---|---|---|
| 2,813,719 | 11/1957 | Hopper | 244/1 TD |
| 3,872,375 | 3/1975 | Rouka | 244/1 TD |
| 4,184,681 | 1/1980 | Graham, Jr. | 244/1 TD |
| 5,102,145 | 4/1992 | Luttrell | 244/1 TD |
| 5,603,470 | 2/1997 | Fitzgerald et al. | 244/1 TD |

*Primary Examiner*—J. Woodrow Eldred
*Attorney, Agent, or Firm*—Evenson, McKeown, Edwards & Lenahan, P.L.L.C.

[57] ABSTRACT

A starting device for a flying body on an aircraft includes a structural frame fixed to the aircraft, a towed-body holding saddle on which the towed flying body can be held by the effect of the tractive forces of the trail line and at least one swivelling lever by means of which the towed-body holding saddle is swivellably connected with the structural frame. The towed-body holding saddle is swivellable so that it can be moved, together with the towed flying body, from a first position close to the aircraft, into a parallel position farther away from the aircraft and back. The position away from the aircraft is displaced outwardly and downwardly, relative to the axes of the aircraft, the position close to the aircraft.

9 Claims, 3 Drawing Sheets

STARTING DEVICE FOR A TOWED FLYING BODY

BACKGROUND AND SUMMARY OF THE INVENTION

This application claims the priority of German patent document 198 12 330.2 filed Mar. 20, 1998, the disclosure of which is expressly incorporated by reference herein.

The invention relates to a starting device for a flying body that is towed by an aircraft. Such towed bodies are used, for example, as decoys for the self-protection of an airplane or as a target for firing practice.

In particular, the invention provides a starting device for such a towed flying body which meets the following objectives:

Maximal free floating of the trail line with respect to the horizontal tail unit of the aircraft;

disposition of the towed body in an air current which is as undisturbed as possible (unaffected by the current of the aircraft); and a construction which is as robust and operationally safe as possible.

These requirements are achieved by the starting arrangement according to the invention, which has the following characteristics:

A structural frame fixed to the aircraft;

a towed-body holding saddle on which the towed flying body can be held by the tractive forces of the trail line; and at least one swivelling lever which swivellably connects the towed-body holding saddle with the structural frame.

The towed-body holding saddle is swivellable, so that it can be moved, together with the towed flying body, from a first position close to the aircraft, into a parallel position farther away from the aircraft, and back again. The position farther away from the aircraft is displaced, downwardly and rearwardly, (relative to the aircraft) with respect to the position close to the aircraft.

In an advantageous embodiment, the starting unit is arranged in a container mounted on the airplane, so that an increase of the drag occurs only when the towed body holding saddle is swivelled to the position farther away from the aircraft.

Other objects, advantages and novel features of the present invention will become apparent from the following detailed description of the invention when considered in conjunction with the accompanying drawings.

DETAILED DESCRIPTION OF THE DRAWING

Figure 1:
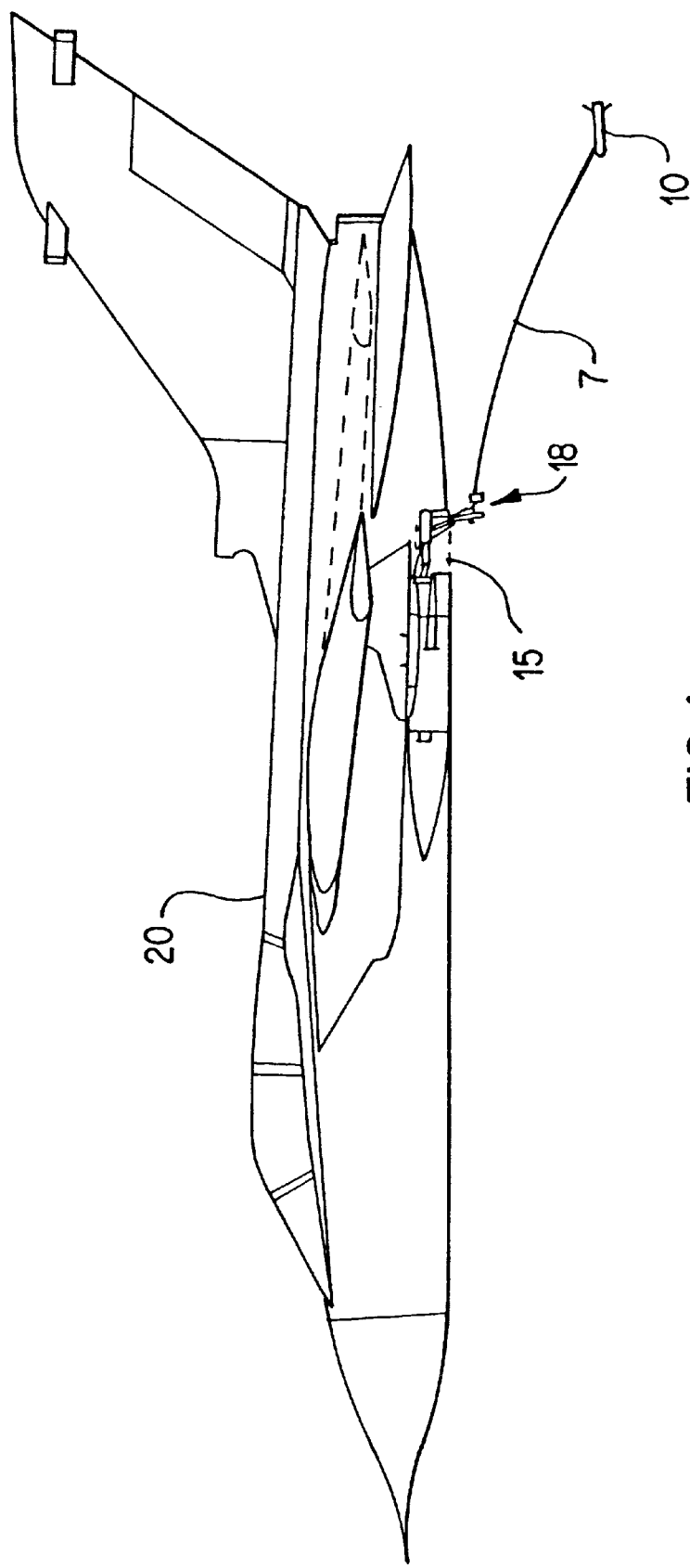
FIG. 1 is a view of an aircraft and the starting device according to the invention, with the towed body being discharged.

FIG. 1 illustrates an aircraft 20 with a starting device 18 according to the invention carried in an outside cargo container 15 mounted on the aircraft. In FIG. 1 the starting device is shown in the swivelled-out position, and the towed body 10 (which is used here as a decoy) is pulled behind the aircraft by means of a trail line 7.

Figure 2:
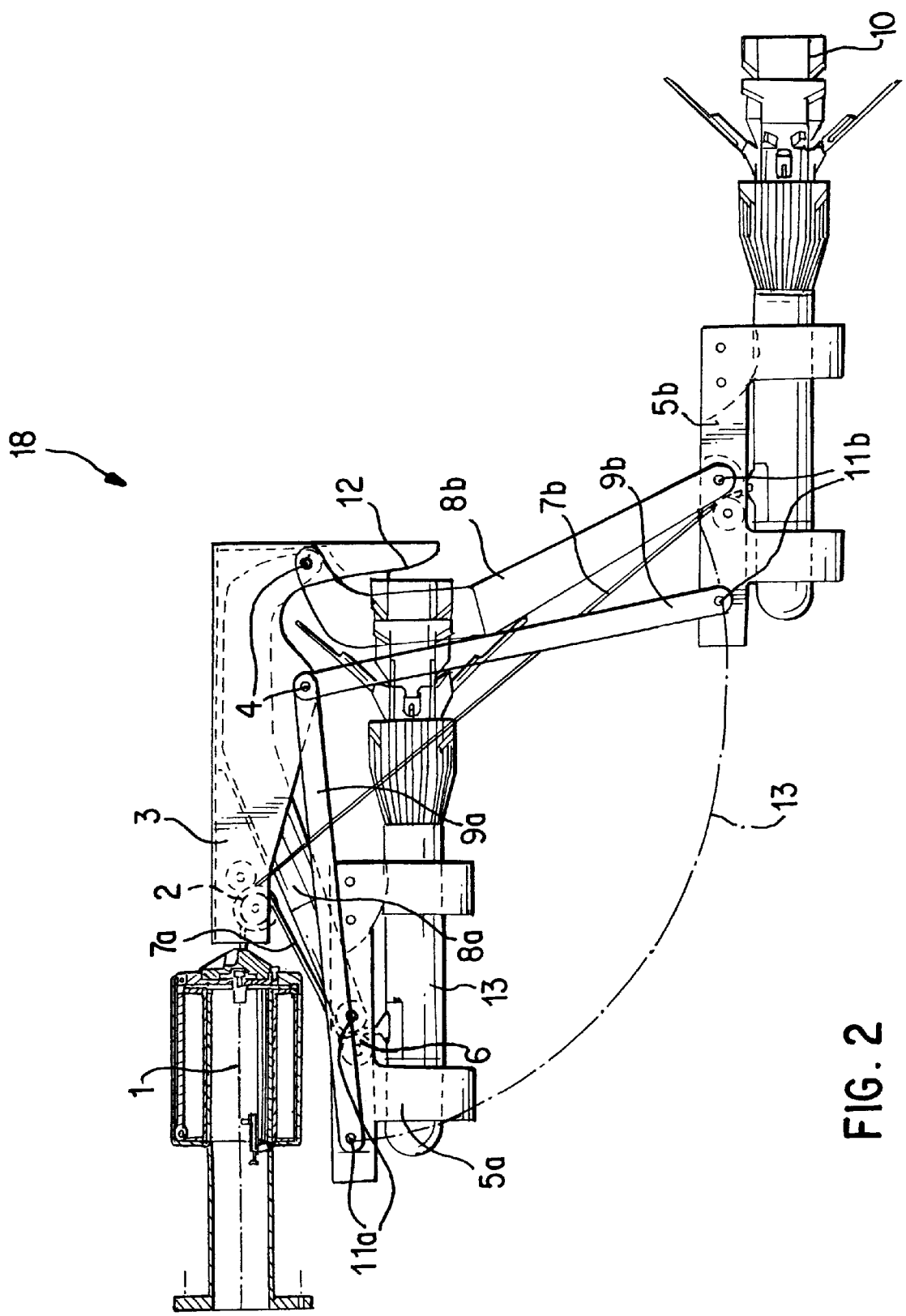
FIG. 2 is a lateral view of the starting device according to the invention.
Figure 3:
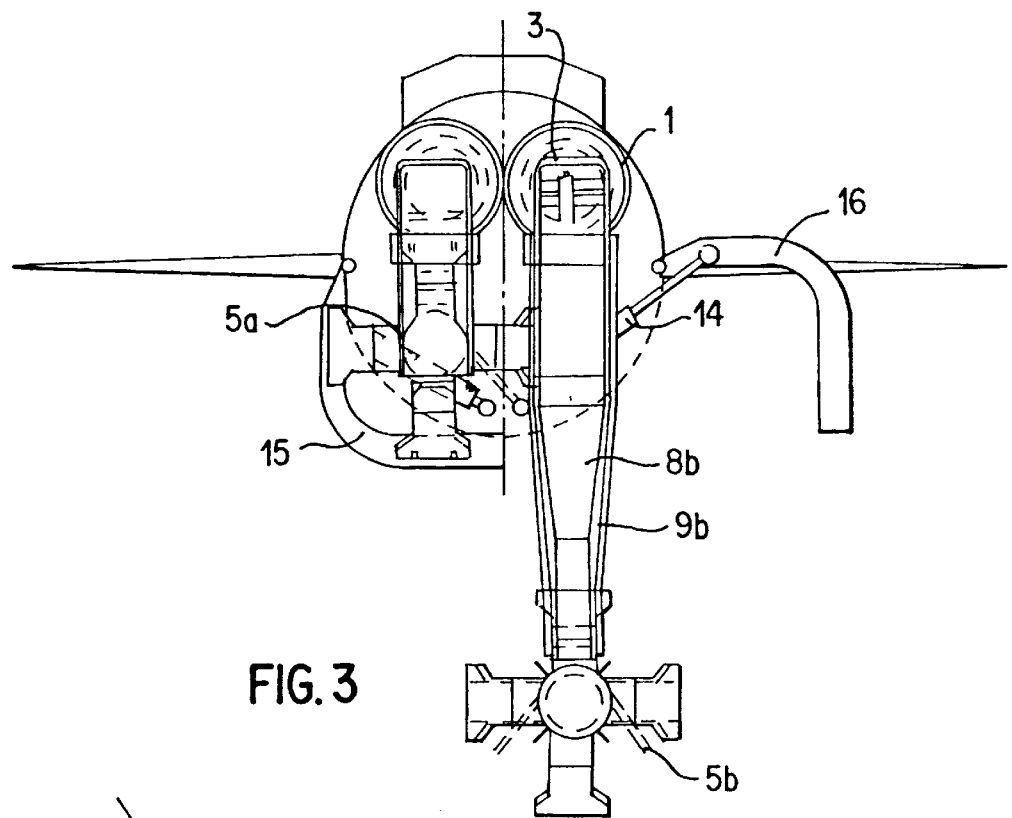
FIG. 3 is a rear view of two starting devices according to the invention which are arranged in a container on an aircraft.
Figure 4:
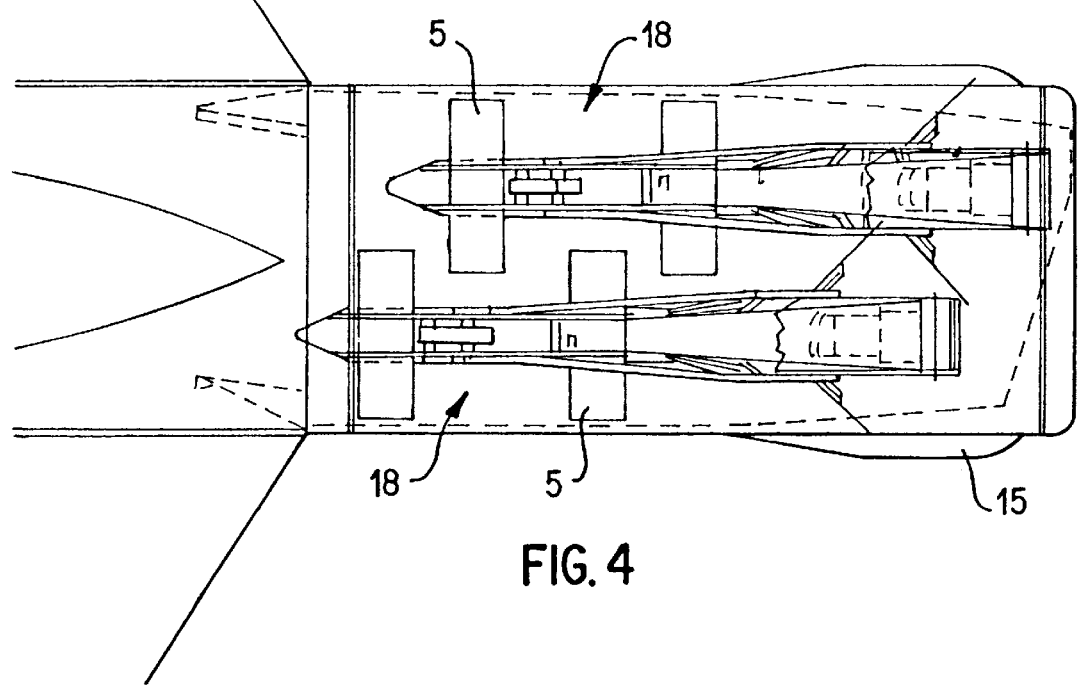
FIG. 4 is a top view of two starting devices according to the invention which are arranged in a container on an aircraft.

FIG. 2 shows in greater detail an embodiment of the starting device 18 according to the invention. The components marked with the suffix "a" indicate the swivelled-in position (close to the aircraft), while the components marked with the suffix "b" indicate the swivelled-out position (farther away from the aircraft). The whole starting unit is linked together by means of a U-shaped structural frame 3, which is closed on top, in the aircraft outside cargo container 15 (FIGS. 3 and 4). An upper line deflection unit 2, which connects the trail line winch 1 with the towed body 10 is situated on the top left in the structural frame 3. The towed-body holding saddle 5a is situated below the structural frame 3 in the stowed position 5a, and is connected by two parallel swivelling levers 8a, 9a with the structural frame 3 at bearing points 4. The bearing points of the swivelling levers 8a, 9a at the towed-body saddle 5a have the reference number 11a.

In typical embodiments, the length of a swivelling lever is in the range of approximately 40 to 80 cm. Because the mechanical forces due to air flow resistance as described below are borne predominantly by the rearward swivelling lever 8a disposed on the inside in the structural frame 3 as well as in the towed-body saddle 5, the reward swivelling lever is constructed as a closed torsional or bending support. The forward exterior swivelling lever 9a is used only for the parallel alignment of the towed-body saddle 5a.

The towed decoy body 10 is held in the towed-body saddle 5 by way of a trail line 7a mounted on top and the lower line deflection unit 6. If, after the opening of the flap 16 of the outside cargo container 15 (FIG. 3), the trail line winch 1 is now unreeled the towed-body saddle 5 together with the towed body 10 will fall downward into the air current, as the result of the force of gravity. (The broken line 13 shows the movement path of one of the bearings 11a.) By means of the existing dynamic pressure, the whole unit is then pressed into the rearward stop position 12. In this position, away from the aircraft, the trail line is therefore in position 7b. The towed-body saddle 5 (on which the towed body 10 is still docked) is in position 5b, while the swivelling levers are in positions 8b and 9b. If the trail line 7b is now unreeled further, the towed body easily detaches from the towed-body saddle and can be let out in an almost undisturbed current to its end position behind the aircraft.

During the towing flight, the container flaps 16 can be closed. Corresponding recesses (not shown) for the swivelling levers 8b, 9b are provided in the flaps for this purpose. When the towed body 10 is pulled in again, the described operations take place in a reverse sequence. After the redocking of the towed body 10 on the towed-body saddle 5, the starting device can easily be pulled back into the outside cargo container 15 by way of the trail line 7. The flap 16 of the outside cargo container can then be closed. For opening and closing the flap 16, an actuator 14 can be used which is, for example, driven pneumatically or electrically in a conventional manner.

FIG. 4 is a top view of the starting devices 18 corresponding to FIG. 3 arranged in the outside cargo container 15. The arrangement of two starting devices in the same container is advantageous mainly for reasons of redundancy. As a result of the stacked installation, which is achieved by a displacement in the axial direction, a highly efficient space-saving arrangement is obtained. The prerequisite of a nearly vertical lowering of the starting device along the initial distance, so that the laterally protruding towed-body saddle 5 is cleared from the second starting device, is achieved by means of the starting device according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A starting device for releasably mounting a towed flying body on an aircraft, comprising a structural frame fixed to the aircraft;

a towed-body holding saddle for holding a towed flying body;

at least one swivelling lever which swivellably connects the towed-body holding saddle with the structural frame so that the towed-body holding saddle can be moved, together with a towed flying body held therein, from a first position close to the aircraft, into a parallel position away from the aircraft and back, the position away from the aircraft being displaced rearwardly and downwardly, relative to the axes of the aircraft, from the position close to the aircraft; and a trail line for connection to a towed flying body to exert a tractive force, thereon and releasably holding the towed flying body on the towed-body holding saddle.

2. The starting device according to claim 1, wherein in the position away from the aircraft the towed-body holding saddle is held in position by dynamic air flow pressure.

3. Starting device according to claim 1, the towed-body holding saddle and the towed flying body, can be moved from the position away from the aircraft into the position close to the aircraft by means of retraction of the trial line.

4. Starting device according to claim 2, the towed-body holding saddle and the towed flying body, can be moved from the position away from the aircraft into the position close to the aircraft by means of retraction of the trial line.

5. Starting device according to claim 1, comprising two parallel extending swivelling levers between the towed-body holding saddle and the structural frame, one of said levers bearing mechanical forces due to dynamic air flow, and the other providing a parallel alignment of the towed-body holding saddle.

6. Starting device according to claim 2, comprising two parallel extending swivelling levers between the towed-body holding saddle and the structural frame, one of said levers bearing mechanical forces due to dynamic air flow, and the other providing a parallel alignment of the towed-body holding saddle.

7. Starting device according to claim 3, comprising two parallel extending swivelling levers between the towed-body holding saddle and the structural frame, one of said levers bearing mechanical forces due to dynamic air flow, and the other providing a parallel alignment of the towed-body holding saddle.

8. Starting device according to claim 4, comprising two parallel extending swivelling levers between the towed-body holding saddle and the structural frame, one of said levers bearing mechanical forces due to dynamic air flow, and the other providing a parallel alignment of the towed-body holding saddle.

9. Starting device according to claim 1, wherein the position close to the aircraft is inside a container mounted on the aircraft, and the position away from the aircraft is outside said container.

* * * * *